(12) United States Patent
Medan et al.

(10) Patent No.: US 10,951,661 B1
(45) Date of Patent: Mar. 16, 2021

(54) SECURE PROGRAMMING INTERFACE HIERARCHIES

(71) Applicant: Amazon Technologies, Inc., Seattle, WA (US)

(72) Inventors: Eran Medan, Alpharetta, GA (US); Matthew Ira Bretan, Irvine, CA (US); Ian Matthew Gary Meyers, East Molesey (GB); Frank Leslie Van Deman, V, Virginia Beach, VA (US)

(73) Assignee: Amazon Technologies, Inc., Seattle, WA (US)

( * ) Notice: Subject to any disclaimer, the term of this patent is extended or adjusted under 35 U.S.C. 154(b) by 249 days.

(21) Appl. No.: 15/973,961

(22) Filed: May 8, 2018

(51) Int. Cl.
*H04L 29/06* (2006.01)
*H04L 29/08* (2006.01)
*G06F 21/62* (2013.01)

(52) U.S. Cl.
CPC ............ *H04L 63/205* (2013.01); *G06F 21/62* (2013.01); *H04L 67/025* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2007/0168872 A1* | 7/2007 | Almonte | G06F 9/451 715/761 |
| 2013/0283340 A1* | 10/2013 | Biswas | G06F 21/44 726/1 |
| 2016/0261606 A1* | 9/2016 | Salvador | H04L 63/02 |

* cited by examiner

*Primary Examiner* — Andrew J Steinle

(74) *Attorney, Agent, or Firm* — Davis Wright Tremaine LLP (57) ABSTRACT

A distributed system hosts a plurality of programming interfaces managed according to a hierarchy of security policies. In response to receiving a request from a client to invoke one of the programming interfaces, the system determines whether the client is authorized to call the programming interface by mapping from an attribute of the client to a location in the hierarchy. The system calls the interface in response to determining that the client is authorized to call programming interfaces associated with the location. The programming interface implements the security policy that corresponds to the location.

20 Claims, 7 Drawing Sheets

SECURE PROGRAMMING INTERFACE HIERARCHIES

BACKGROUND

Data security involves the use of security controls to prevent the unauthorized disclosure or modification of information. Examples of security controls include user authentication procedures, access restriction mechanisms, and auditing features. Although security controls are effective, they may be difficult to manage, particularly in distributed systems and multi-user environments. This is particularly true for systems that implement fine-grained control over access to data.

BRIEF DESCRIPTION OF THE DRAWINGS

Various techniques will be described with reference to the drawings, in which.

DETAILED DESCRIPTION

Embodiments of the present disclosure are directed to controlling access to data in a distributed, multi-user computing system. In an embodiment, a computing system hosts programming interfaces that control access to data according to a hierarchy of security policies. When a client calls one of the programming interfaces, the computing system determines whether the call is authorized by mapping from client attributes to a location in the hierarchy. If the mapping indicates that the client is authorized to call programming interfaces associated with that location, the call proceeds. The programming interface implements the security policy corresponding to that location in the hierarchy.

In an embodiment, a hierarchy of security policies corresponds to a data hierarchy. Each security policy applies to a location or region of the data hierarchy. In an example, a hierarchy of security policies governs access to a collection of database tables. In this example, a root-level security policy might permit access to the entire collection, a mid-level security policy might only permit access to a specific table, and a leaf-level policy might only permit access to a particular row.

In an embodiment, programming interfaces are managed according to a hierarchy of security policies. The programming interfaces are each mapped to a location in the hierarchy, and in some embodiments each programming interface is assigned a name that is indicative of the location. Further, each programming interface is implemented to comply with a security policy that corresponds to the location. Continuing the previous example, in an embodiment compliance with the security policy includes coding the programming interface so that it cannot access data outside of the region of the data hierarchy governed by the security policy. In some cases, compliance may involve excluding from the programming interface any code that would be capable of accessing data outside of the permitted region of the data hierarchy.

In an embodiment, the programming interface is implemented to apply a security policy independently of the privileges associated with the client. In other words, the programming interface may be implemented with reference to the security privileges associated with a position in the hierarchy, and may not need to consider whether a particular client has a particular set of privileges. These checks are still performed, but by other components of the system.

In an embodiment, an API gateway service facilitates access to a hierarchy of programming interfaces. A client may call one of the programming interfaces by providing the API gateway with an identifier of the interface and, if applicable, any parameters necessary to complete the call. The API gateway service may also facilitate publishing of the hierarchy of programming interfaces. In an embodiment, the implementer of the programming interfaces uses the API gateway service to publish the interfaces to clients. The API gateway may help to manage large numbers of interfaces, and to facilitate the addition of new interfaces that provide access to newly added data. Because many of the programming interfaces may provide access to only a small portion of the data hierarchy, there may be a large number of interfaces. Moreover, as additional is added to the data hierarchy, new programming interfaces may also be added to provide access to the new portions of the data hierarchy. The API gateway helps to enable these features.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following. In certain embodiments, security mechanisms may be made more efficient. In certain embodiments, complexity is reduced. Furthermore, in certain embodiments, fine-grained access control is enabled.

Figure 1:
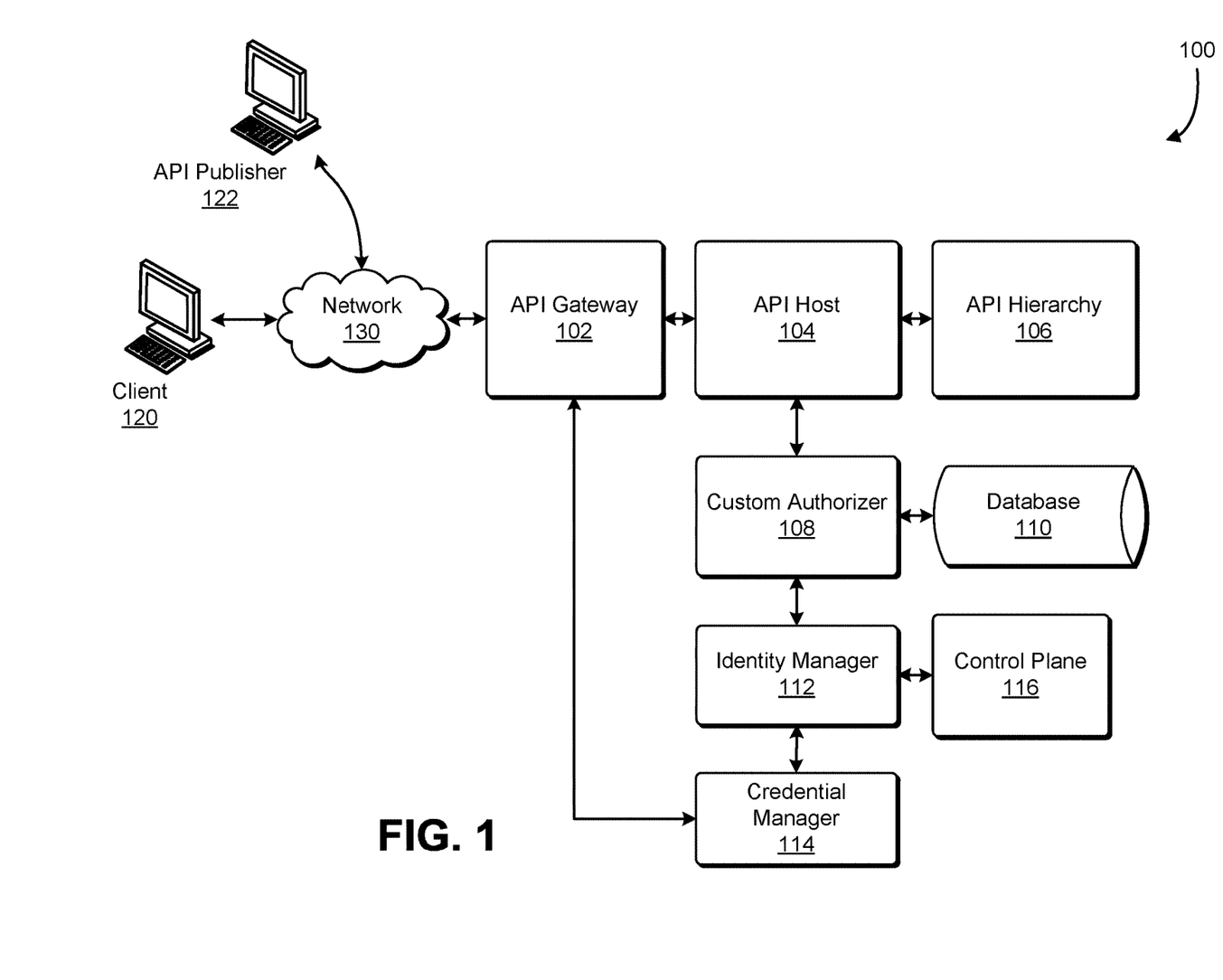
FIG. 1 illustrates an example of a computing system hosting an API hierarchy, in accordance with an embodiment.

In an embodiment, a computing system hosts an API hierarchy that provides restricted access to resources or data. An API hierarchy refers to a plurality of programming interfaces that is organized as a hierarchy and is managed according to a hierarchy of security policies. FIG. 1 illustrates an example embodiment of a distributed computing system 100 that hosts an API hierarchy.

In an embodiment, a distributed computing system 100 provides clients 120 with access to programming interfaces of the API hierarchy 106. The API hierarchy 106 comprises a collection of programming interfaces. As used herein, the term programming interface generally refers to a procedure, method, subroutine, or function, although in some cases the term may also be used to refer to the signature or definition of a procedure, method, subroutine, or function. In an embodiment, the programming interfaces of the API hierarchy 106 are provided to the distributed computing system 100 by an API publisher 122. The API publisher 122 implements the code for the programming interfaces and sends it, via the network 130, to the distributed computing system 100. In an embodiment, an API gateway 102 receives the code for the programming interfaces of the API hierarchy 106.

In an embodiment, the API gateway 102 provides a client 120 with access to the programming interfaces. The API gateway 102 comprises one or more application servers, such as those depicted in FIG. 7, and executable instructions for enabling the API publisher 122 to provide code for the interfaces, and for the client 120 to access the programming interfaces. Accessing a programming interface involves calling a programming interface, and is sometimes referred to as invoking a programming interface. Accessing a programming interface thus causes the associated procedure, method, subroutine, or function to be executed, and in some cases may result in data being returned to the client 120.

In an embodiment, a client 120 requests the invocation of one of the programming interfaces of the API hierarchy 106. The client 120 does so by transmitting a request, via a network 130, to the API gateway 102. In an embodiment, the request is transmitted as a message comprising an identifier of the programming interface and, if applicable, one or more parameters of the programming interface. In response to receiving the message, the API gateway 102 identifies the programming interface based on the identifier, and then calls the programming interface. If applicable, the API gateway 102 provides the included parameters in its call to the programming interface. When the method, function, procedure, or subroutine has finished executing, the API gateway 102 provides the client 120, via network 130, with any data that resulted from the execution of the programming interface.

Figure 3:
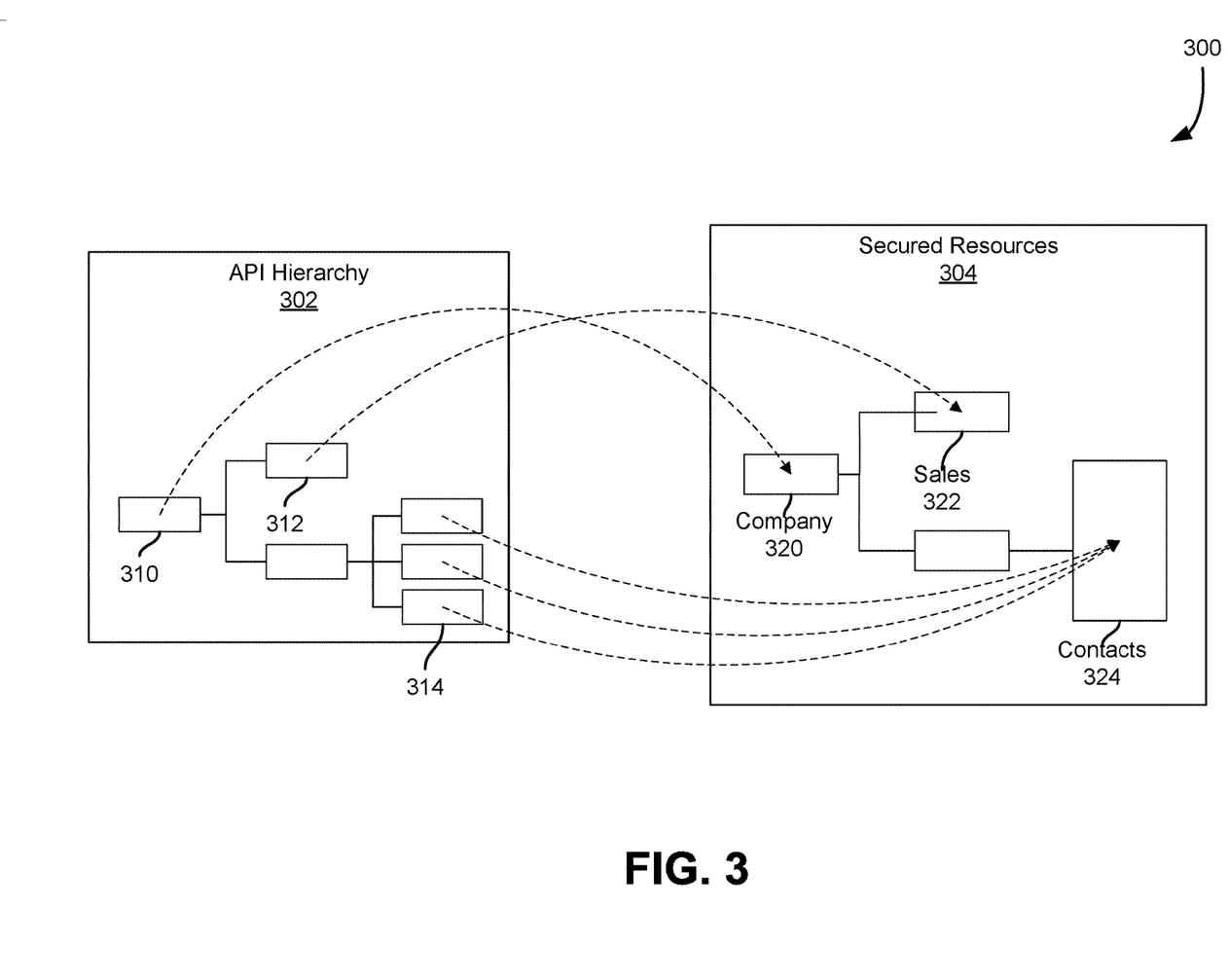
FIG. 3 depicts an example of an API hierarchy accessing a secured resource, in accordance with an embodiment.
Figure 4:
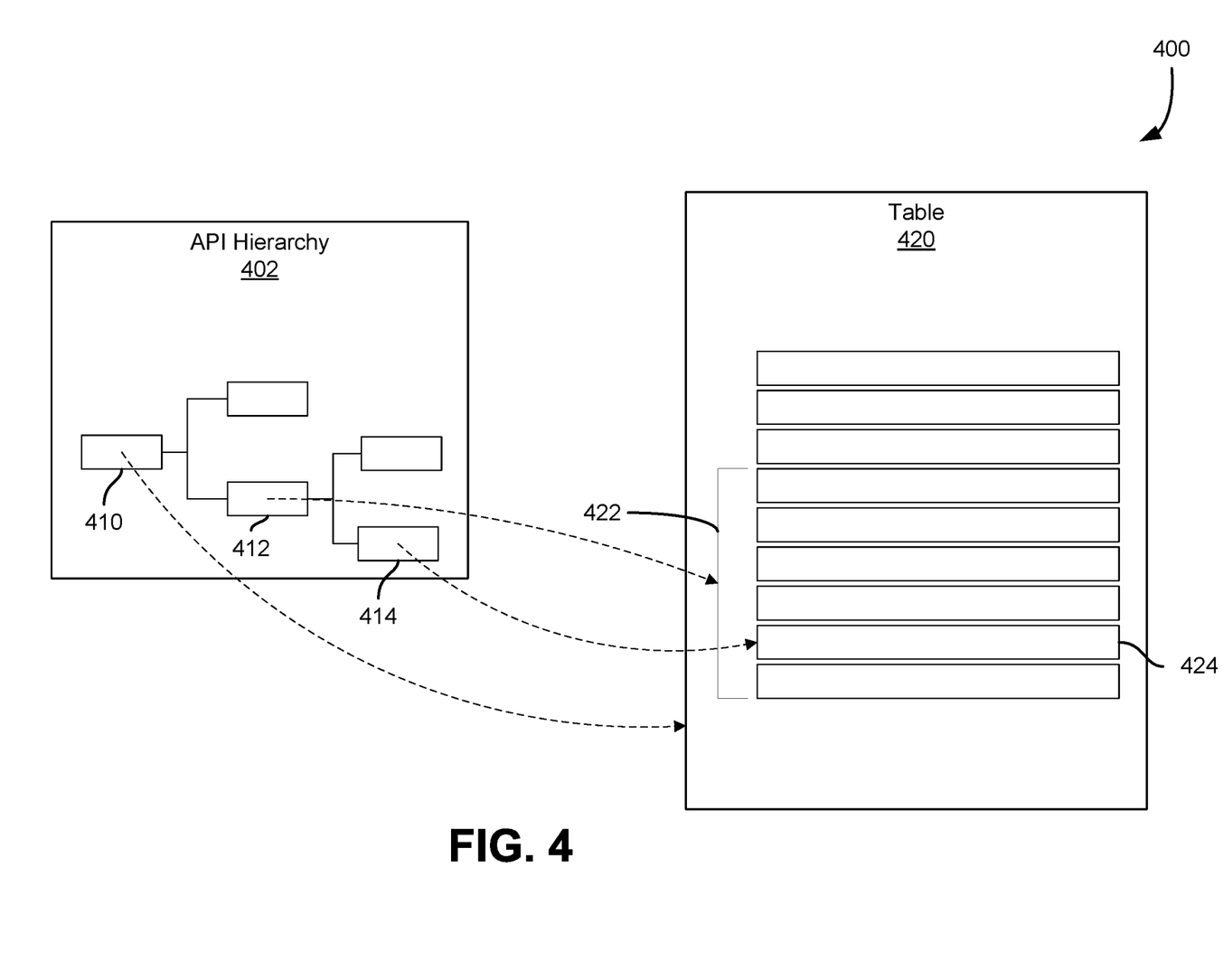
FIG. 4 depicts an example of an API hierarchy implementing row-level access control, in accordance with an embodiment.

In an embodiment, the programming interfaces of the API hierarchy 106 are identified by a hierarchy of identifiers. In aspects of this embodiment, an identifier is a uniform resource identifier, a uniform resource name, or a uniform resource locator. In a further aspect, each identifier is indicative of a location in a hierarchy. For example, a programming interface might be identified as "company.sales.get-data." This suggests a location in a hierarchy comprising at least three nodes, a company node, a sales node, and a get-data node. Furthermore, the hierarchy may, in an embodiment, correspond to a hierarchy of security policies and/or a hierarchy of data. Further aspects of identifiers and API hierarchies are illustrated in FIGS. 3 and 4.

In an embodiment, the programming interfaces of the API hierarchy 106 are hosted by an API host 104. The API host 104 comprises one or more application servers, such as those depicted in FIG. 7, and executable instructions for providing computing capacity to execute the programming interfaces of the API hierarchy 106. Computing capacity refers to processor time, memory, storage, or other capabilities of a computing device.

In an embodiment, the API Host 104 is a distributed computing system comprising a plurality of application servers which provide computing capacity to execute the programming interfaces of the API hierarchy 106. Application servers may be added or removed from the distributed system to scale according to demand.

In an embodiment, the distributed computing system system 100 provides a API publisher 122 with capabilities for hosting a programming interface without requiring the publisher to maintain a server. For example, a publisher may provide source or executable code for a programming interface to the distributed computing system 100. This code is executed on one or more computing nodes of the API Host 104, without the publisher having to maintain a physical or virtual server, or even be aware of the particulars of the application servers on which the code executes.

In an embodiment, access to the API hierarchy 106 is secured in part by a credential manager 114 and identity manager 112. The credential manager 114 and identity manager 112 assist the API Host 104 and API gateway 102 in restricting access to the API hierarchy 106. In an embodiment, the credential manager 114 provides credential verification for a user, group, account, role, or entity associated with a request to invoke a programming interface. The identity manager 112 determines what resources the identified user, group, account, role, or entity is authorized to access. As used herein, an identity may refer to a user, group, account, role, or entity.

In an embodiment, the identity manager 112 is a component of a service for controlling access to a resource. The service may comprise mechanisms for managing users, accounts, groups, and roles. The service may also comprise tools for enabling and disabling access, and setting access policies.

In an embodiment, the identity manager 112 generates an assertion document that describes a security policy. In an embodiment, the assertion document comprises a list of assertions, each of which grants, revokes, or modifies a privilege. In an embodiment, the API Host 104 determines, based on an assertion, whether an invocation of a programming interface is authorized. For example, in an embodiment, the API host 104 obtains an assertion and determines whether or not the assertion authorizes access to a programming interface. If so, the API host 104 invokes the interface on behalf of the client 120.

In an embodiment, an assertion document is a Security Assertion Markup Language ("SAML") document. SAML is a standard for exchanging authentication and authorization data. In an embodiment, a SAML document is an Extended Markup Language ("XML") document containing a list of SAML assertions. A SAML assertion may be an authentication statement, an attribute statement, or an authorization decision statement. An authentication statement asserts that a security principal has been authenticated. An attribute statement provides information about the security principal, and is typically provided as a name-value pair. An authorization decision statement can indicate that the principal is authorized to access a resource. An authorization decision statement may also be formulated as an expression. For example, an authorization decision statement may assert that a security principal is permitted to perform an action on a given resource in accordance with a set of conditions.

In an embodiment, an assertion document is an Extensible Access Control Markup Language ("XACML") document. Like SAML, XACML is a standard for exchanging authentication and authorization data. An XACML document may contain a list of policy assertions, such as attributes, targets, conditions, and obligations. Similar to SAML documents, XACML documents are capable of flexibly expressing authorization decisions.

In an embodiment, an assertion may specify a security principal, resource, action, a condition, and an effect. In some embodiments, a permission may also specify a plurality of one or more of these elements such as, for example, a set or class of users, a collection of resources, several different actions, and/or multiple conditions. In some embodiments, the permission may specify one or more wildcard characters that may be used to denote that the permission may be modified to make the permission applicable to different users and their associated resources. Wildcards may be represented in various formats—for example, an asterisk may represent any number of characters and a question mark may represent any single character.

In an embodiment, a security principal may be a user, a group, an organization, a role, or a collection and/or combination of these or other such entities. A security principal may be any entity that is capable of submitting, through a client, API calls that cause an action associated with a resource to be performed and/or any entity to which permissions associated with a resource may be granted.

In an embodiment, the resource refers to a computing resource of a computing resource service provider. Computing resources of a computing resource service provider may include: compute resources (e.g., virtual machine instances); storage resources (e.g., scalable storage, block storage, and managed file storage systems); database systems (e.g., managed relational database systems); migration services (e.g., applications, services, and hardware for streamlining the transfer of data from one physical data center to another); network and content delivery; developer tools; management tools; security, identity, and access management services; analytics services; artificial intelligence services; and more. Computing resources may be organized in a hierarchy, and may use structures such as folders, directories, buckets, etc. to organize sets of computing resources into groupings.

In an embodiment, the resource is identified by a resource name that uniquely identifies the resource. In some cases, the resource may be named with the same naming convention as the principal or other elements of the permission. However, this need not be the case, as each separate element of a permission may use a naming convention, namespace, format, etc., that is independent of other elements.

In an embodiment, the action may be the specific action or actions that will be allowed or denied by the permission. Different types of services (e.g., having different service namespaces) may support different actions. For example, an identity and account management service may support an action for changing passwords, and a storage service may support an action for deleting objects. An action may be performed in association with the resource and may, for example, be identified by a type of API call, a library call, a program, process, series of steps, a workflow, or some other such action. As an example, a permission may have an action element specified in the following manner:

Action: storage:GetObject

In this example, the action that is allowed or denied (determined based on the effect specified in the permission) corresponds to a storage service that supports an action (e.g., API call) for GetObject, which may be used in connection with obtaining an object and/or access to an object of a storage service. As discussed elsewhere, various namespaces may be used in connection with specifying an action. Wildcards may be used to specify multiple actions. For example, an action element described as "Action": "storage:*" may refer to all APIs supported by a storage service. In another example, a permission may have an action element specified in the following manner:

Action: company.departmentX.employeeA:GetObject

In the above example, the action pertains to a specific hierarchy location, namely that of employeeA, and describes an action, GetObject, that may be performed on data at that location in the hierarchy. Wildcards may also be used to specify regions of the data hierarchy. For example, a region of the data hierarchy may be specified in the following manner:

Action: company.departmentX.*:GetObject

In the above example, the action pertains to a region of the hierarchy, i.e., all of "department," and describes an action, GetObject, that may be performed at any location within that region of the hierarchy.

It will be appreciated that the above examples are intended to be illustrative of aspects of various embodiments. As such, the provided examples should not be construed in a manner which would restrict the scope of the present disclosure to only those examples provided. Security assertions may be provided in a variety of formats, including but not limited to those formats described here.

In an embodiment, the condition element may be one or more conditions that specify when a policy is in effect. In some embodiments, the condition element is optional and may be omitted in some permissions. Conditions may be described as Boolean expressions that may be used to determine whether the policy is in effect (i.e., if the expression evaluates to TRUE) or not in effect (i.e., if the expression evaluates to FALSE). Policies that are not in effect may be unenforced or ignored by an authorization module (such as those described elsewhere in this). In some embodiments, conditions in a permission may be evaluated against values provided as part of a request to call an API corresponding to one or more APIs specified in the action element.

An effect may refer to whether the permission is used to grant or deny access to the computing resources specified in the permission in the resource element. An effect may be an ALLOW effect, which grants access to a resource, and a DENY effect, which denies access to a resource. In some embodiments, access to computing resources of a computing resource service provider are denied by default and a permission affirmatively including an ALLOW effect is required.

It should be noted that the examples described above merely described one of many ways in which permissions may be expressed. Of course, in other embodiments, variations on the principles described above may be applied in various ways.

In an embodiment, a custom authorizer 108 overrides an assertion provided by the identity manager 112. For example, the assertion provided by the identity manager 112 can be rewritten or regenerated by the custom authorizer 108 to identify the programming interfaces that the client 120 is authorized to access. In an embodiment, the custom authorizer 108 uses a database 110 to map from attributes associated with the client to a set of authorized programming interfaces.

In an embodiment, an API publisher 122 provides the distributed computing system 100 with code for a custom authorizer 108. In an embodiment, the code implements a function that, when called, obtains identity information associated with the client 120 and then determines, based on the information, a set of programming interfaces that the client 120 is authorized to invoke.

In an embodiment, the database 110 is hosted by the distributed computing system 100 on behalf of the API publisher. For example, in an embodiment, the database 110 is hosted on an application server, such as the application server described below. The contents of the database 110 can be provided by the API publisher 122 according to the needs of the custom authorizer 108. For example, in an embodiment, the database 110 is maintained so that it contains an updated mapping between clients and the locations of a hierarchy.

In an embodiment, the custom authorizer 108 function maps from attributes of the client to locations or regions of the API hierarchy 106. The custom authorizer 108 further determines whether the client is authorized or unauthorized to access programming interfaces within a given location or region. These determinations may then be specified in the modified or regenerated assertion.

In an embodiment, the identity manager 112 integrates with a control plane 116 of the distributed computing system 100. The control plane may also be referred to as a management plane. The control plane 116 has access to directory information, such as information that may be obtained by accessing an active directory server. This information may include information pertaining to users, groups, accounts, roles, or entities, which may further be mapped by the control plane to locations or regions in the API hierarchy 106. In an embodiment, the identity manager 112 dynamically generates a security assertion based on this information. In an embodiment, the generated security assertion is provided directly to the API host 104, bypassing the custom authorizer 108.

In an embodiment, a security assertion is dynamically generated based on a user, group, account, role, or entity. For example, a single group might be used to enable access for a number of different end-users. In an embodiment, an individual end-user may have different intended permissions than other uses. For example, the security assertion generated for a request issued by a first user may refer to a different region of the API hierarchy 106 than the security assertion generated for a second user.

In an embodiment, a security assertion is dynamically generated based on multiple factors. These factors may include, but are not limited to, client attributes, including attributes related to the client's request to access a programming interface. For example, these factors can include the time a request was issued, or the location a request was issued from.

In an embodiment, the API host 104 applies an assertion in order to determine whether a request to invoke a programming interface may be authorized. This operation comprises determining whether the requested programming interface is included in those authorized by the assertion. For example, if a modified or regenerated assertion indicates that a client is authorized to access inter region of a hierarchy, the API host 104 can determine that the requested programming interface lies within the same region of the hierarchy and allow the interface to be invoked.

Figure 7:
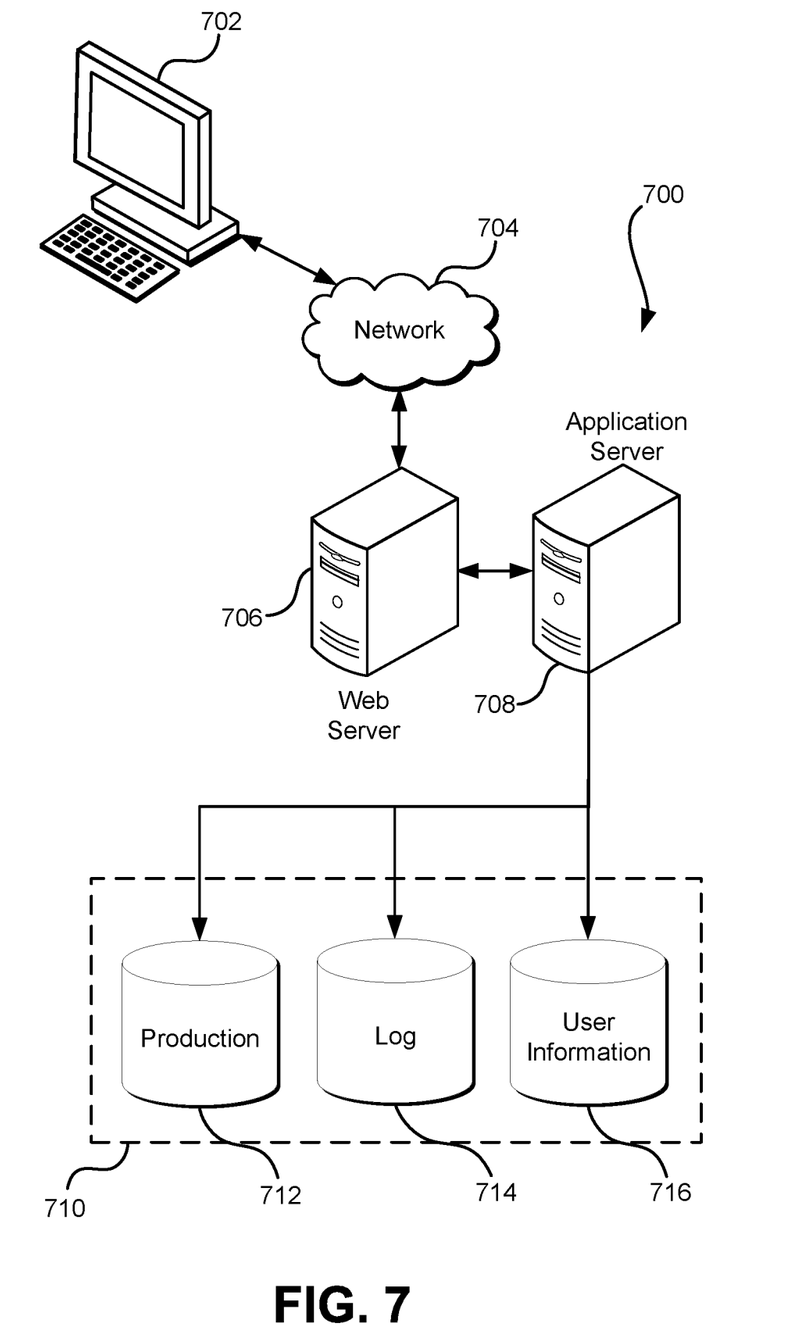
FIG. 7 illustrates a system in which various embodiments can be implemented.

In an embodiment, components of FIG. 1, including the custom authorizer 108, database 110, identity manager 112, and credential manager 114 comprise software modules which execute on one or more application servers, such as the application servers 708 depicted in FIG. 7. Here, a software module refers to a memory of a computing device, such as an application server 708, and to instructions, at least some of which are loaded into the memory and which are executable by a processor of the computing device.

In an embodiment, privileges associated with a client are dynamically altered by a method, function, procedure, or subroutine provided by an API publisher, such as the API publisher 122 depicted in FIG. 1. Customizations to the security policy permit the API publisher 122 to dynamically adjust the permission set in response to factors such as a change to the quantity or nature of the data being protected.

Figure 2:
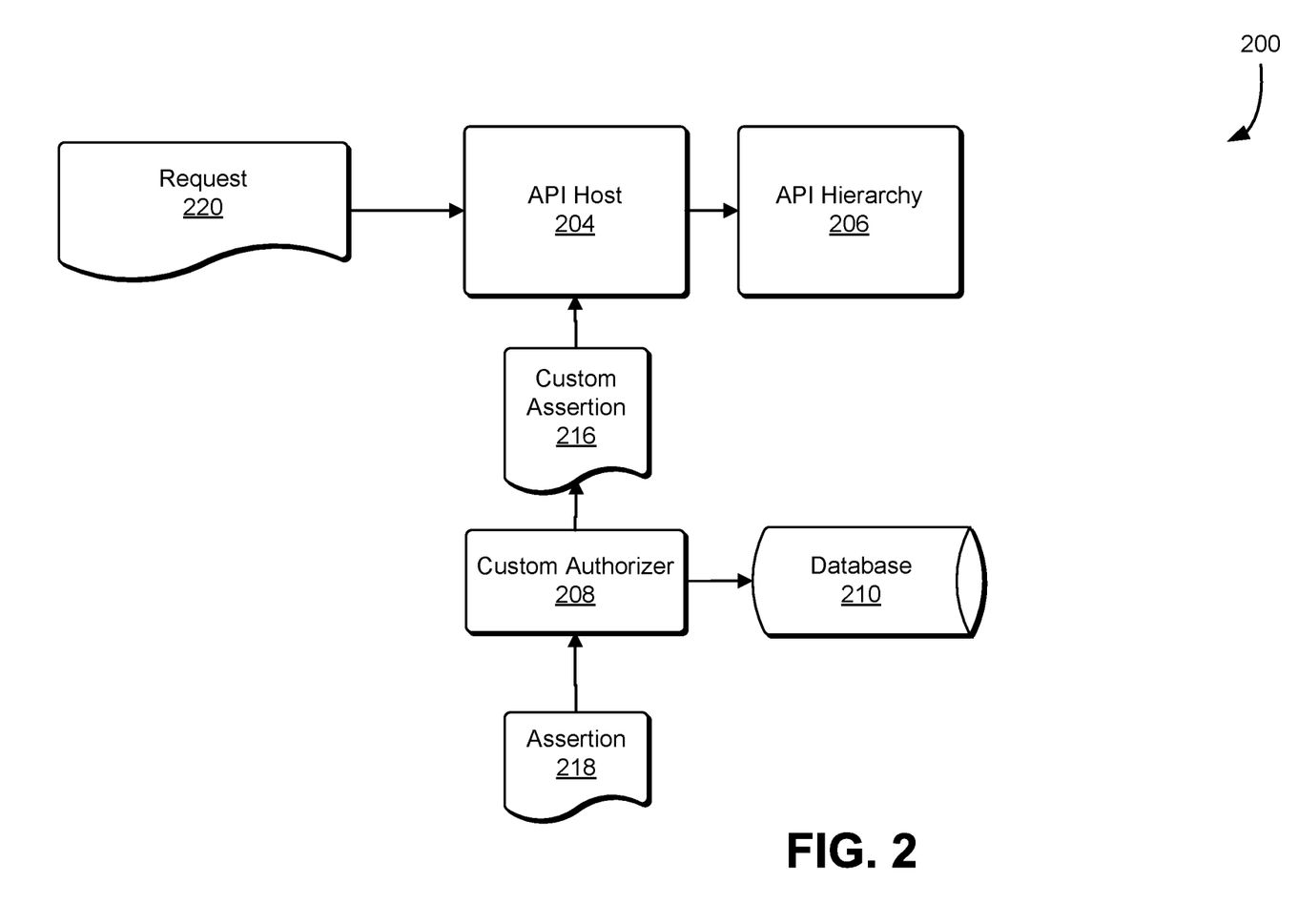
FIG. 2 illustrates further aspects of an example of a custom authorizer, in accordance with an embodiment.

FIG. 2 illustrates further aspects of an example embodiment of a custom authorizer. A distributed computing system 200, which may correspond to the distributed computing system 100 of FIG. 1, may comprise an API host 204, API hierarchy 206, custom authorizer 208, and database 210. These may correspond to the API host 104, API hierarchy 106, custom authorizer 108 and database 110 of FIG. 1.

In an embodiment, the custom authorizer 208 receives an assertion 218. The assertion comprises one or more statements issued by an authority, such as an identity manager 112 and/or credential manager 114. The statements can include authentication information, e.g., information confirming that the identity of a client has been verified, attributes of the clients, and privilege information, such as an indication of whether a privilege is being granted or revoked.

In an embodiment, the assertion 218 indicates that a client is entitled to access fewer portions of an API than intended by the API publisher. For example, the assertion 218 might exclude any access to the API, or be limited to a small set of functions. In some cases, the default assertion 218 limits access to initialization and/or login functions of an example API.

In an embodiment, the assertion 218 indicates that a client is entitled to access more portions of an API than is intended by the API publisher. For example, the assertion 218 might indicate that a client can access any programming interface within an API, even though the publisher of the API intends that the client only be able to access a subset of the API.

In an embodiment, the custom authorizer 208 modifies or replaces the assertion 218. The resulting custom assertion 216 can also contain authentication information, client attributes, and privilege information. The custom assertion 216 further includes privilege information for the portions of the API that the client is authorized to access. In an embodiment, the API comprises a plurality of programming interfaces arranged as a hierarchy. The customer assertion 216 includes privilege assertions for locations and/or regions in the hierarchy that the client is authorized to access.

In an embodiment, a database 210 comprises information mapping between client attributes and portions of the API hierarchy 206. For example, in an embodiment the database 210 comprises a table indexed by an identity attribute, through which a list of authorized programming interfaces is obtained by querying the database table.

In an embodiment, the API host 204 processes the custom assertion 216 to determine whether a request 220 is authorized. The request 220 comprises an identifier of a programming interface, and may optionally include parameters to be used for invoking the programming interface.

In an embodiment, an API hierarchy, such as the API hierarchies 106, 206 depicted in FIGS. 1 and 2, is mapped to a hierarchy of resources, such as a data hierarchy. FIG. 3 depicts an embodiment of an API hierarchy 302 accessing a secured resource 304.

Here, secured resources 304 refers to a set of resources to which access is to be restricted. As seen in FIG. 3, the resources may be arranged into a hierarchy, and this hierarchy may be made to correspond to a hierarchy of programming interfaces. In an embodiment, an API hierarchy 302 is mapped to secured data 304. The mapping 300 refers to correspondence between the programming interfaces of the API hierarchy 302 and the portions of the secured resources 304 that each programming interface accesses.

In an embodiment, the API hierarchy 302 is an API that is organized according to a hierarchy. The API hierarchy 302 may, for example, correspond to the API hierarchy 106 illustrated by FIG. 1. Organization of the API refers to a naming convention of the programming interfaces, and to management of security. The hierarchy reflects the portions of the secured resources 304 that each of the programming interfaces is able to access. For example, a programming interface 310 at the root of the API hierarchy 302 might be named "company.get-data," and be programmed to access data at or below the root 320 of a hierarchy of secured resources 304. In this example, the "company.get-data" programming interface is implemented so that it is able to access company-wide data, such as sales data 322 and contacts data 324. Similarly, a programming interface 312 further down in the hierarchy might be named "company.sales.get-data" and be programmed to access data 322 pertaining to the "sales" department, but not any other data. Other programming interfaces 314 might be named "company.contacts.employeeOne," "company.contacts. employeeTwo," and so on. These interfaces might be able to access any data in the contacts portion of the secured resources 304, but not anywhere else such as the sales data 322.

In an embodiment, an API hierarchy is mapped to a data hierarchy, such as a collection of database tables. FIG. 4 depicts an example 400 of an embodiment of an API hierarchy that maps to a data hierarchy for implementing row-level access control. In the example of FIG. 4, an API hierarchy 402 is mapped to a table 420. The mapping 300 refers to correspondence between programming interfaces of the API hierarchy 402 and portions of the table 420 that each programming interface is able to access.

In an embodiment, an API hierarchy 402 comprises a plurality of programming interfaces organized as a hierarchy. The organization comprises a hierarchical naming convention for the programming interfaces, and management of security according to a hierarchy. For example, a programming interface 410 at the root of the hierarchy is programmed to be able to access any row within the table 420. Moving further down the hierarchy, a programming interface 412 at the second level of the API hierarchy 402 is programmed to be able to access a portion 422 of the table 420, but not data outside of the portion 422. At the lowest level of the API hierarchy 402, a programming interface 414 is programmed to be able to access a specific row 424, but not any other portion of the table 420.

In an embodiment, the API hierarchy 402 may be implemented at further levels of granularity, such as column-level. For example, a programming interface 414 might be programmed to permit access to only a specific set of columns within a given row 424. In an embodiment, a programming interface might permit access to the values for a particular column, or set of columns, across multiple rows.

Figure 5:
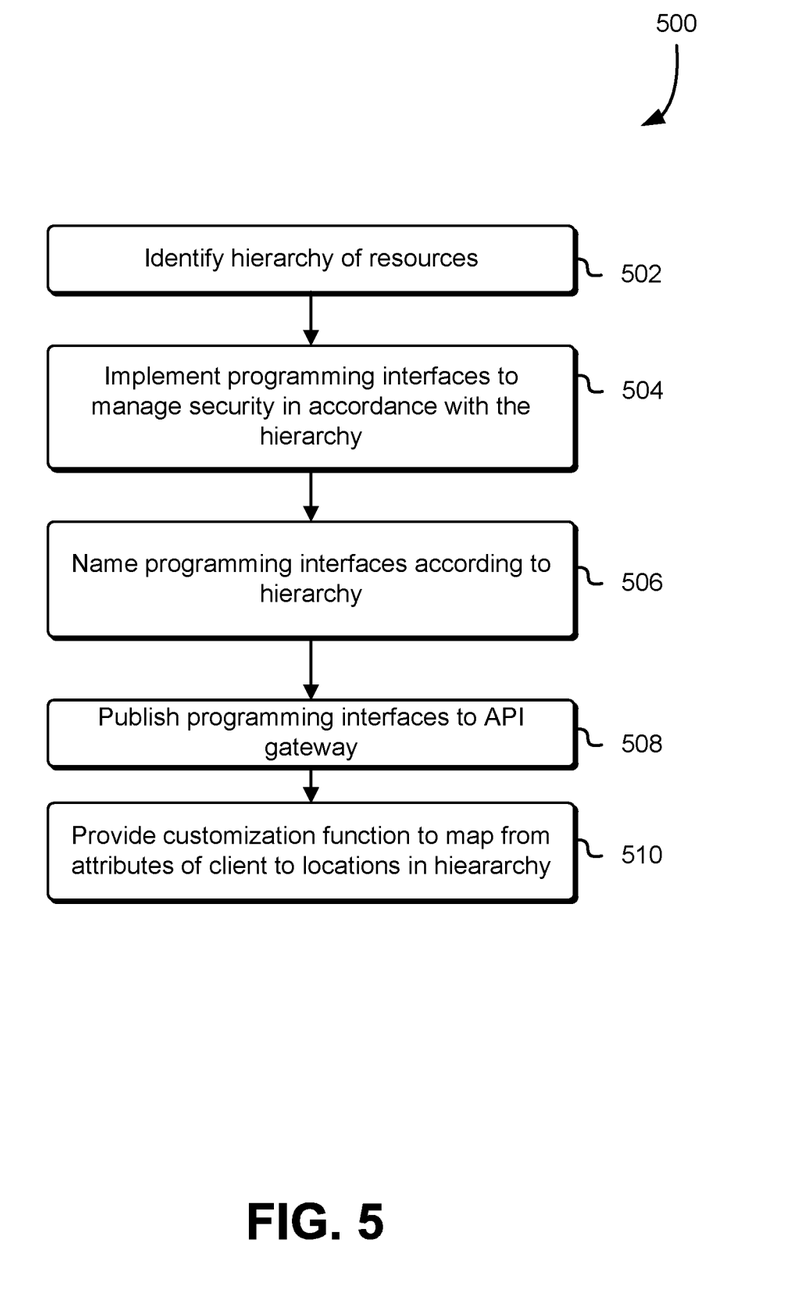
FIG. 5 depicts an example of a procedure for utilizing an API hierarchy, in accordance with an embodiment.

FIG. 5 depicts an embodiment of a procedure for utilizing an API hierarchy. The example procedure 500 of FIG. 5 depicts preparatory steps for utilizing a system which performs the example procedure of FIG. 6. These steps may be performed, for example, by the API publisher 122 depicted in FIG. 1. Although FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

In an embodiment, a hierarchy of resources is identified at step 502. A resource hierarchy is a set of resources whose access is to be governed by a corresponding hierarchy of security policies. In an embodiment, the hierarchy of resources is a hierarchy of data. Examples of hierarchies are illustrated by FIGS. 3 and 4. However, these examples should not be construed so as to limit the scope of the present disclosure to only the examples provided.

In an embodiment, at step 504, programming interfaces are implemented so that they manage security in accordance with the hierarchy. This comprises the programming interface being implemented in accordance with its associated position in the hierarchy. For example, the programming interface complies with limits on data or other resources it accesses, in accordance with a security policy that corresponds to the associated position in the hierarchy. For example, in an embodiment, a programming interface is implemented according to a security policy governing access to a row of a table. The programming interface is implemented to permit access to this row, but not to any other data. In a further aspect, an ancestor of this security policy governs access to the table, and a corresponding interface is implemented to permit access to data in the table, and to prevent access to data not in the table.

In an embodiment, at step 506, the programming interfaces are named according to the hierarchy. In an example, each programming interface is associated with a uniform resource identifier which both uniquely identifies the interface and which identifies a position in the hierarchy. The naming can be used, in an embodiment, to facilitate mapping into the hierarchy. However, in an embodiment, the programming interfaces are named independently of the hierarchy.

In an embodiment, at step 508, the programming interfaces are published to an API gateway service. The API gateway service may, for example, correspond to the API gateway 102 that is illustrated in FIG. 1. In an embodiment, publishing the programming interfaces comprises receiving code for a programming interface, and storing an association between the code and an identifier from step 506. When a client attempts to call a programming interface, the API gateway uses the identifier to locate the provided code and cause it to be executed. The call may be validated by comparing the identifier of the programming interface to locations in the hierarchy that the client is authorized to access.

In an embodiment, at step 510, a customization function is provided to map from attributes of a client to locations in the hierarchy. In some instances, the implementer of the programming interfaces provides the customization function to the API gateway. The function receives parameters comprising a digitally signed set of asserted security privileges. The function is implemented to provide a modified set of asserted security privileges. In a further aspect, the modified set may be digitally signed. The modified set of asserted privileges (or, equivalently, a new or regenerated set of asserted privileges) indicates which programming resources a client is authorized to access.

In an embodiment, the customization function permits dynamic alteration of the set of privileges associated with a client. In an embodiment, dynamic alteration permits the authorized regions of the hierarchy to be adapted in response to changes to the underlying set of resources. For example, if a new table of data is added, an API publisher may publish new programming interfaces which access the table. The customization function may then include, as appropriate, authorization to access the new programming interfaces.

Figure 6:
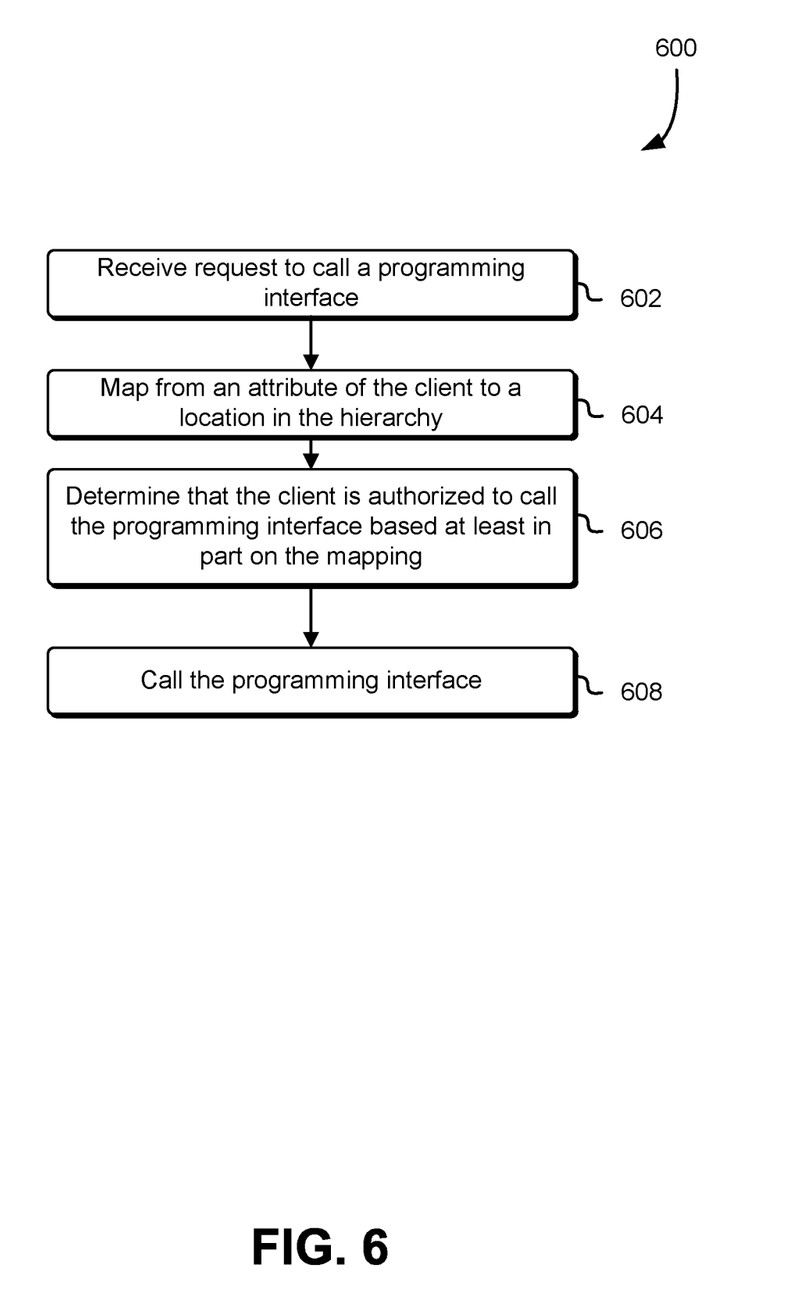
FIG. 6 depicts an example of a procedure for providing secure access to resource using an API hierarchy, in accordance with an embodiment.

FIG. 6 depicts an example 600 of an embodiment of a procedure for providing secure access to resource using an API hierarchy. Although FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

In an embodiment, at step 602, a distributed computing system receives a request to call a programming interface. The distributed computing system may correspond to the distributed computing system 100 depicted in FIG. 1. In an embodiment, the request comprises an identifier of the programming interface. If applicable to the programming interface being called, the parameters used by the programming interface are also included. In an embodiment, the request also comprises information identifying the client, such as authentication credentials or a token obtained via a credentials manager, such as the credential manager 114 depicted in FIG. 1.

In an embodiment, at step 604, the distributed computing system maps from an attribute of the client to a location in the hierarchy. The mapping may be performed by an identity manager 112 or a custom authorizer 108. In an embodiment, the mapping comprises querying a database to find authorized locations or regions of a hierarchy. For example, in an embodiment a database comprises a table of expressions, keyed by a client attribute, which describe locations or regions of an API hierarchy 106.

In an embodiment, the mapping comprises obtaining a set of asserted security privileges corresponding to the client. The asserted security privileges may be a default set of security privileges provided by an identify manager 112, or a new, modified, or regenerated set of asserted security privileges provided by a custom authorizer 108. The asserted security privileges express locations or regions in the hierarchy. For example, the asserted security privileges may specify the name of a particular programming interface identifiers, or may specify a pattern of programming interface identifiers.

In an embodiment, at step 606, the distributed computing system 100 determines that the client is authorized to call the programming interface. The determination is based at least in part on comparing the location of the programming interface in the hierarchy to the location or regions determined by the mapping to be authorized for the client. Then, at step 608, an embodiment system calls the programming interface and it is executed. In an embodiment, the programming interface is executed on an API host, such as the API host 104 depicted in FIG. 1. The code for the programming interface adheres to the security policy corresponding to the position in the hierarchy, and therefore only performs actions which are permitted for that region in the hierarchy. Note that the programming interface does not necessarily need to be aware of the client's particular privileges. Instead, the programming interface adheres to the policy associated with the position in the hierarchy, independently of any particular client privilege.

In an embodiment, the example procedures of FIGS. 5 and 6 are practiced on a web-based system comprising a web server and a plurality of application servers. With reference also to FIG. 1, an API publisher may provide code corresponding to an API hierarchy 106 and custom authorizer 108 to the distributed computing system 100 via a web server. Likewise, a client 120 may request that the programming interfaces of the API hierarchy 106 be invoked by accessing the distributed computing system 100 via a web server. Likewise, components of the distributed computing system 100 may be implemented on an application server. Examples of a web server and application server are described below.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto and the application server 708 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device 702. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C"

refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    at least one processor; and
    at least one memory comprising instructions that, in response to being executed by the at least one processor, cause the system at least to:
        receive a request from a client to call a programming interface, wherein the programming interface is one of a plurality of programming interfaces that control access to data according to a hierarchy of security policies;
        determine that the client is authorized to call the programming interface, based at least in part on mapping from an attribute of the client to a location in the hierarchy; and
        call the programming interface, wherein the programming interface:
            controls access to data based on a security policy corresponding to the location in the hierarchy; and
            implements the security policy by at least excluding code capable of accessing data other than data in a first dataset.

2. The system of claim 1, further comprising a gateway service that provides the client with access to one or more of the plurality of programming interfaces based at least in part on a hierarchy of identifiers corresponding to the hierarchy of security policies.

3. The system of claim 1, wherein the security policy corresponds to the first dataset the client is authorized to access, and wherein an ancestor of the security policy in the hierarchy of security policies corresponds to a second dataset encompassing the first dataset.

4. The system of claim 1, wherein the programming interface controls access to data independently of privileges associated with the client.

5. The system of claim 1, wherein the plurality of programming interfaces are organized to correspond to positions in the hierarchy of security policies.

6. A method, comprising:
receiving a request from a client to call a programming interface, wherein the programming interface is one of a plurality of programming interfaces managed according to a hierarchy of security policies;
determining that the client is authorized to call the programming interface, based at least in part on mapping from an attribute of the client to a location in the hierarchy; and
calling the programming interface, wherein the programming interface implements a security policy, the security policy corresponding to the location in the hierarchy and excluding code from the programming interface capable of accessing data at another location of data outside of a location of data corresponding to the location in the hierarchy of security policies.

7. The method of claim 6, further comprising:
receiving, from a customization function, a set of asserted security privileges, wherein the set of asserted security privileges is indicative of authorization to call the programming interface.

8. The method of claim 7, wherein the first set of asserted security privileges is digitally signed.

9. The method of claim 6, wherein the security policy corresponds to a row of data the client is authorized to access, and wherein an ancestor of the security policy in the hierarchy of security policies corresponds to a table comprising the row.

10. The method of claim 9, wherein the programming interface implements the security policy by accessing only the row of data.

11. The method of claim 6, wherein the hierarchy of security policies corresponds to a hierarchy of data.

12. The method of claim 11, wherein managing the plurality of programming interfaces according to the hierarchy of security policies comprising limiting each of the plurality of programming interfaces to accessing data in a corresponding position in the hierarchy of data.

13. A non-transitory computer-readable storage medium comprising executable instructions that, as a result of execution by one or more processors of a computer system, cause the computer system to at least:
receive a request from a client to call a programming interface, wherein the programming interface is one of a plurality of programming interfaces managed according to a hierarchy of security policies;
determine that the client is authorized to call the programming interface, based at least in part on a mapping of an attribute of the client to a location in the hierarchy; and
call the programming interface, wherein the programming interface implements a security policy corresponding to the location in the hierarchy and preventing access to data other than data corresponding to the location.

14. The non-transitory computer-readable storage medium of claim 13, wherein each of the plurality of programming interfaces is identified by one of a hierarchy of identifiers.

15. The non-transitory computer-readable storage medium of claim 13, wherein the instructions further comprise instructions that, as a result of execution by the one or more processors, cause the computer system to:
provide a first set of asserted security privileges to a customization function; and
receive, from the customization function, a second set of asserted security privileges, wherein the second set of asserted security privileges authorizes the call to the programming interface.

16. The non-transitory computer-readable storage medium of claim 15, wherein the instructions further comprise instructions that, as a result of execution by the one or more processors, cause the computer system to digitally sign the second set of asserted security privileges.

17. The non-transitory computer-readable storage medium of claim 13, wherein the security policy corresponds to a row of data the client is authorized to access, and wherein an ancestor of the security policy in the hierarchy of security policies corresponds to a table comprising the row.

18. The non-transitory computer-readable storage medium of claim 13, wherein the hierarchy of security policies corresponds to a hierarchy of data.

19. The non-transitory computer-readable storage medium of claim 13, wherein the instructions further comprise instructions that, as a result of execution by the one or more processors, cause the computer system to:
receive code for a programming interface; and
associate the programming interface with an identifier.

20. The non-transitory computer-readable storage medium of claim 19, wherein the instructions further comprise instructions that, as a result of execution by the one or more processors, cause the computer system to authorize the call based at least in part on comparing the identifier to the location in the hierarchy.

* * * * *